(12) United States Patent
Braley et al.

(10) Patent No.: US 10,758,936 B2
(45) Date of Patent: Sep. 1, 2020

(54) CARBON NANOMATERIAL COMPOSITE SHEET AND METHOD FOR MAKING THE SAME

(71) Applicants: The Boeing Company, Chicago, IL (US); General Nano, LLC, Cincinnati, OH (US)

(72) Inventors: Daniel J. Braley, St. Peters, MO (US); John H. Belk, St. Louis, MO (US); Jacob I. Battat, St. Louis, MO (US); Justine M. Truscello, St. Louis, MO (US); Daniel R. Ferriell, St. Louis, MO (US); Joseph Sprengard, Cincinnati, OH (US); Larry Christy, Cincinnati, OH (US)

(73) Assignees: The Boeing Company, Chicago, IL (US); General Nano, LLC, Cincinnati, OH (US)

( * ) Notice: Subject to any disclaimer, the term of this patent is extended or adjusted under 35 U.S.C. 154(b) by 23 days.

(21) Appl. No.: 15/007,379

(22) Filed: Jan. 27, 2016

(65) Prior Publication Data
US 2017/0158511 A1    Jun. 8, 2017

Related U.S. Application Data

(60) Provisional application No. 62/264,633, filed on Dec. 8, 2015.

(51) Int. Cl.
*C01B 32/168* (2017.01)
*B05D 3/12* (2006.01)
(Continued)

(52) U.S. Cl.
CPC ............... *B05D 3/12* (2013.01); *B05D 1/02* (2013.01); *B05D 1/30* (2013.01); *B05D 3/0254* (2013.01);
(Continued)

(58) Field of Classification Search
USPC ........ 977/742, 750, 752, 762; 442/179, 349, 442/354, 50, 52, 59, 110, 111, 172, 376,
(Continued)

(56) References Cited

U.S. PATENT DOCUMENTS

| 3,969,563 A | 7/1976 | Hollis, Sr. |
| 4,522,889 A * | 6/1985 | Ebneth ............... B64D 45/02 244/1 A |

(Continued)

FOREIGN PATENT DOCUMENTS

| CN | 102001448 A | 4/2011 |
| CN | 102056353 | 5/2011 |

(Continued)

OTHER PUBLICATIONS

International Search Report and the Written Opinion of the International Searching Authority, PCT/US2016/064789, dated Sep. 1, 2017.

(Continued)

*Primary Examiner* — Matthew D Matzek
(74) *Attorney, Agent, or Firm* — Walters & Wasylyna LLC

(57) ABSTRACT

A carbon nanomaterial composite sheet and a method for making a carbon nanomaterial composite sheet may include a layer of a carbon nanomaterial structure being bonded to a carrier layer, the carrier layer being fabricated from a porous metalized nonwoven material.

20 Claims, 9 Drawing Sheets

(51) Int. Cl.
 *B05D 1/02* (2006.01)
 *B05D 1/30* (2006.01)
 *B05D 3/02* (2006.01)
 *C23C 28/00* (2006.01)
 *C23C 24/08* (2006.01)
 *B32B 5/16* (2006.01)
 *B32B 5/24* (2006.01)
 *B64C 3/20* (2006.01)
 *B32B 5/02* (2006.01)
 *B32B 15/20* (2006.01)
 *B32B 15/02* (2006.01)
 *B32B 9/00* (2006.01)
 *B32B 15/14* (2006.01)
 *B32B 9/04* (2006.01)
 *B32B 3/26* (2006.01)
 *B32B 5/26* (2006.01)

(52) U.S. Cl.
 CPC .............. *B32B 3/266* (2013.01); *B32B 5/022* (2013.01); *B32B 5/024* (2013.01); *B32B 5/026* (2013.01); *B32B 5/16* (2013.01); *B32B 5/24* (2013.01); *B32B 5/26* (2013.01); *B32B 9/007* (2013.01); *B32B 9/041* (2013.01); *B32B 9/047* (2013.01); *B32B 15/02* (2013.01); *B32B 15/14* (2013.01); *B32B 15/20* (2013.01); *B64C 3/20* (2013.01); *C01B 32/168* (2017.08); *C23C 24/08* (2013.01); *C23C 28/00* (2013.01); *C23C 28/322* (2013.01); *C23C 28/34* (2013.01); *C23C 28/42* (2013.01); *B32B 2250/05* (2013.01); *B32B 2255/02* (2013.01); *B32B 2255/06* (2013.01); *B32B 2255/205* (2013.01); *B32B 2260/023* (2013.01); *B32B 2260/046* (2013.01); *B32B 2262/02* (2013.01); *B32B 2262/0261* (2013.01); *B32B 2262/0269* (2013.01); *B32B 2262/0276* (2013.01); *B32B 2262/101* (2013.01); *B32B 2262/106* (2013.01); *B32B 2262/14* (2013.01); *B32B 2307/202* (2013.01); *B32B 2307/204* (2013.01); *B32B 2307/206* (2013.01); *B32B 2307/212* (2013.01); *B32B 2307/584* (2013.01); *B32B 2307/712* (2013.01); *B32B 2307/718* (2013.01); *B32B 2605/18* (2013.01)

(58) Field of Classification Search
 USPC .................................. 442/377, 379
 See application file for complete search history.

(56) References Cited

U.S. PATENT DOCUMENTS

| | | | |
|---|---|---|---|
| 4,546,033 | A | 10/1985 | Tsuchimoto et al. |
| 4,752,415 | A | 6/1988 | Waskow et al. |
| 5,089,325 | A | 2/1992 | Covey |
| 5,254,399 | A | 10/1993 | Oku et al. |
| 5,985,112 | A | 11/1999 | Fisher |
| 6,483,087 | B2 | 11/2002 | Gardner et al. |
| 7,208,115 | B2 | 4/2007 | Sheridan et al. |
| 7,244,407 | B2 | 7/2007 | Chen et al. |
| 7,345,242 | B2 | 3/2008 | Chen |
| 7,419,601 | B2 | 9/2008 | Cooper et al. |
| 7,459,121 | B2 | 12/2008 | Liang et al. |
| 7,622,405 | B1* | 11/2009 | Arvidson ............... B32B 27/32 442/135 |
| 7,955,535 | B2 | 6/2011 | Liang et al. |
| 7,993,620 | B2 | 8/2011 | Lashmore et al. |
| 8,021,640 | B2 | 9/2011 | Kim et al. |
| 8,137,653 | B1 | 3/2012 | Predtechensky et al. |
| 8,146,861 | B2 | 4/2012 | Lengsfeld et al. |
| 8,283,403 | B2 | 10/2012 | Mao et al. |
| 8,351,220 | B2 | 1/2013 | Liang et al. |
| 8,455,043 | B2 | 6/2013 | Chang et al. |
| 8,753,602 | B2 | 6/2014 | Shanov et al. |
| 2002/0035170 | A1 | 3/2002 | Glatkowski et al. |
| 2006/0017191 | A1 | 1/2006 | Liang et al. |
| 2006/0062944 | A1* | 3/2006 | Gardner ................. B82Y 30/00 428/34.1 |
| 2008/0057265 | A1 | 3/2008 | Liang et al. |
| 2008/0191606 | A1 | 8/2008 | Geohegan et al. |
| 2008/0308209 | A1 | 12/2008 | Loutfy et al. |
| 2009/0092813 | A1 | 4/2009 | Lin et al. |
| 2009/0111282 | A1* | 4/2009 | Ward ..................... B82Y 10/00 438/768 |
| 2010/0159240 | A1 | 6/2010 | Shah et al. |
| 2010/0189883 | A1 | 7/2010 | Pick |
| 2010/0203789 | A1 | 8/2010 | Takebayashi et al. |
| 2010/0270069 | A1 | 10/2010 | Shar et al. |
| 2011/0049292 | A1 | 3/2011 | Kruckenberg et al. |
| 2011/0108545 | A1 | 5/2011 | Wang et al. |
| 2011/0110843 | A1 | 5/2011 | Pasquali et al. |
| 2011/0124253 | A1 | 5/2011 | Shah et al. |
| 2011/0174145 | A1* | 7/2011 | Ogrin .................... C04B 35/053 89/36.02 |
| 2012/0138589 | A1 | 6/2012 | Mitchell et al. |
| 2012/0282453 | A1 | 11/2012 | Wang et al. |
| 2012/0301663 | A1 | 11/2012 | Koike et al. |
| 2013/0316160 | A1 | 11/2013 | Hata et al. |
| 2014/0011414 | A1* | 1/2014 | Kruckenberg ............ B32B 5/16 442/181 |
| 2014/0080378 | A1 | 3/2014 | Wasynczuk |
| 2014/0131096 | A1 | 5/2014 | Silverman et al. |
| 2014/0151111 | A1* | 6/2014 | Shah ..................... H05K 9/009 174/388 |
| 2017/0204519 | A1 | 7/2017 | Kwag et al. |

FOREIGN PATENT DOCUMENTS

| | | |
|---|---|---|
| CN | 102648088 A | 8/2012 |
| CN | 103770391 A | 5/2014 |
| CN | 104603885 A | 5/2015 |
| CN | 104822622 A | 8/2015 |
| CN | 107082410 A | 8/2017 |
| DE | 202 13 477 | 1/2003 |
| DE | 103 00 979 | 7/2004 |
| EP | 0 109 638 | 5/1984 |
| EP | 0 629 549 A2 | 12/1994 |
| EP | 3178966 | 6/2017 |
| EP | 3235632 | 10/2017 |
| JP | 2008-535752 | 9/2008 |
| WO | WO 2004/080578 A1 | 9/2004 |
| WO | WO 2006008978 | 1/2006 |
| WO | WO 2007/149109 A2 | 12/2007 |
| WO | WO 2008/150716 | 12/2008 |
| WO | WO 2010/120426 | 10/2010 |
| WO | WO 2010120426 | 10/2010 |
| WO | WO 2016/004191 | 1/2016 |
| WO | WO 2016/019143 | 2/2016 |

OTHER PUBLICATIONS

European Patent Office, Extended European Search Report, Application No. EP 16 19 2107, (dated Apr. 13, 2017).
Xu et al., "Enhanced Mechanical Properties of Prestressed Multi-Walled Carbon Nanotubes," *Small*, vol. 4, No. 6, pp. 733-737 (2008).
Cheung, "Carbon nanotubes: From stress to strength: Prestressed multiwalled carbon nanotubes have enhanced mechanical properties that are ideal for building space elevators," *NatureChina* (2008).
Behabtu et al., "Strong, Light, Multifunctional Fibers of Carbon Nanotubes with Ultrahigh Conductivity," *Science*, vol. 339, No. 182 (2013).
Wang et al., "High-Ampacity Power Cables of Tightly-Packed and Aligned Carbon Nanotubes," *Advanced Functional Materials*, vol. 24, pp. 3241-3249 (2014).
International Search Report, App. No. PCT/US2010/027704 (dated Aug. 5, 2010).

(56) References Cited

OTHER PUBLICATIONS

State (Chinese) Intellectual Property Office, First Official Action, App. No. 2016800710258 (dated Jan. 30, 2019).
European Patent Office, "Extended European Search Report," App. No. 18195539.4 (dated Mar. 26, 2019).
Malik et al: Manufacturing and Applications of Carbon Nanotube Sheets, Recent Adv. in Circuits, Communications & Signal Processing, WSEAS Press, publisher, Cambridge, UK, Said, et al., p. 327-335 (2013).
Yoon: "Controlling exfoliation in order to minimize damage during dispersion of long SWCNTs for advanced composites," Scientific Reports, vol. 4, p. 1-8 (Jan. 28, 2014).
Malik et al: "Carbon Nanotube Sheet: Processing, Characterization and Applications," Nanotube Superfiber Materials, Chapter 13, Elsevier Inc., Waltham, MA, USA, p. 349-387 (2014).
TFP: "Metal Coated Veils & Mats," TFP Global, retrieved from Wayback machine at: http://web.archive.org/web/20161021025831/http://www.tfpglobal.com/materials/metal-coated (Oct. 21, 2016).
International Searching Authority: International Search Report and Written Opinion, App. No. PCT/US2015/042911 (dated Oct. 22, 2015).
International Searching Authority: International Search Report and Written Opinion, App. No. PCT/US2017/016657 (dated Jun. 8, 2017).
European Patent Office, Extended European Search Report, App. No. 15826306.1 (dated Dec. 1, 2017).
International Searching Authority: International Search Report and Written Opinion, App. No. PCT/US2018/043069 (dated Dec. 17, 2018).
Japan Patent Office, Office Action, with English translation, App. No. 2017505238 (dated Jul. 23, 2019).
China National Intellectual Property Administration, Office Action, with English translation, App. No. 201680008556.2 (dated Dec. 31, 2019).
Final Office Action dated Dec. 11, 2019 in related U.S. Appl. No. 15/329,702, filed Jan. 27, 2017.
European Patent Office, Extended European Search Report, App. No. 17837732.1 (dated Mar. 9, 2020).
Non-Final Office Action dated Jan. 27, 2020 in co-pending U.S. Appl. No. 15/814,662, filed Nov. 16, 2017.

\* cited by examiner

CARBON NANOMATERIAL COMPOSITE SHEET AND METHOD FOR MAKING THE SAME

PRIORITY

This application claims priority from U.S. Ser. No. 62/264,633 filed on Dec. 8, 2015.

FIELD

The present disclosure is generally related to composite materials and, more particularly, to a multifunctional carbon nanomaterial composite sheet including carbon nanomaterials, for example, in the form of a carbon nanomaterial structure, bonded to a porous carrier material, a composite structure including the carbon nanomaterial composite sheet, and methods for making the same.

BACKGROUND

Aerospace vehicles are being designed and manufactured with greater percentages of composite materials. For example, composites may be used in the construction of various primary and secondary structures in aerospace applications, such as composite panels forming the airframe and/or exterior skin (e.g., fuselage, wings, etc.) of an aircraft. Use of composites may increase the strength, decrease the weight, and provide a longer service life of various components of the aerospace vehicle.

However, aerospace vehicles having composite components, such as skin panels, may require application of additional materials for lightning strike protection and/or to shield associated avionics and electronics from external electromagnetic interference. Such additional materials may undesirably increase the weight of the aerospace vehicle and increase the time and cost of production.

Accordingly, those skilled in the art continue with research and development efforts in the field of composite materials.

SUMMARY

In one example, the disclosed carbon nanomaterial composite sheet may include a layer of a carbon nanomaterial structure, and a carrier layer including a porous metalized nonwoven material, the carrier layer being bonded to the carbon nanomaterial structure.

In one example, the disclosed method of fabricating a carbon nanomaterial composite sheet may include the step of: bonding a layer of a carbon nanomaterial structure to a carrier layer, the carrier layer being fabricated from a porous metalized nonwoven material.

In one example, the disclosed composite structure may include at least one fiber-reinforced polymer layer, and a carbon nanomaterial composite sheet, wherein the carbon nanomaterial composite sheet includes a layer of a carbon nanomaterial structure, and a carrier layer including a porous metalized nonwoven material, the carrier layer being bonded to the carbon nanomaterial structure.

Other examples of the disclosed apparatus and methods will become apparent from the following detailed description, the accompanying drawings and the appended claims.

DETAILED DESCRIPTION

Figure 1:
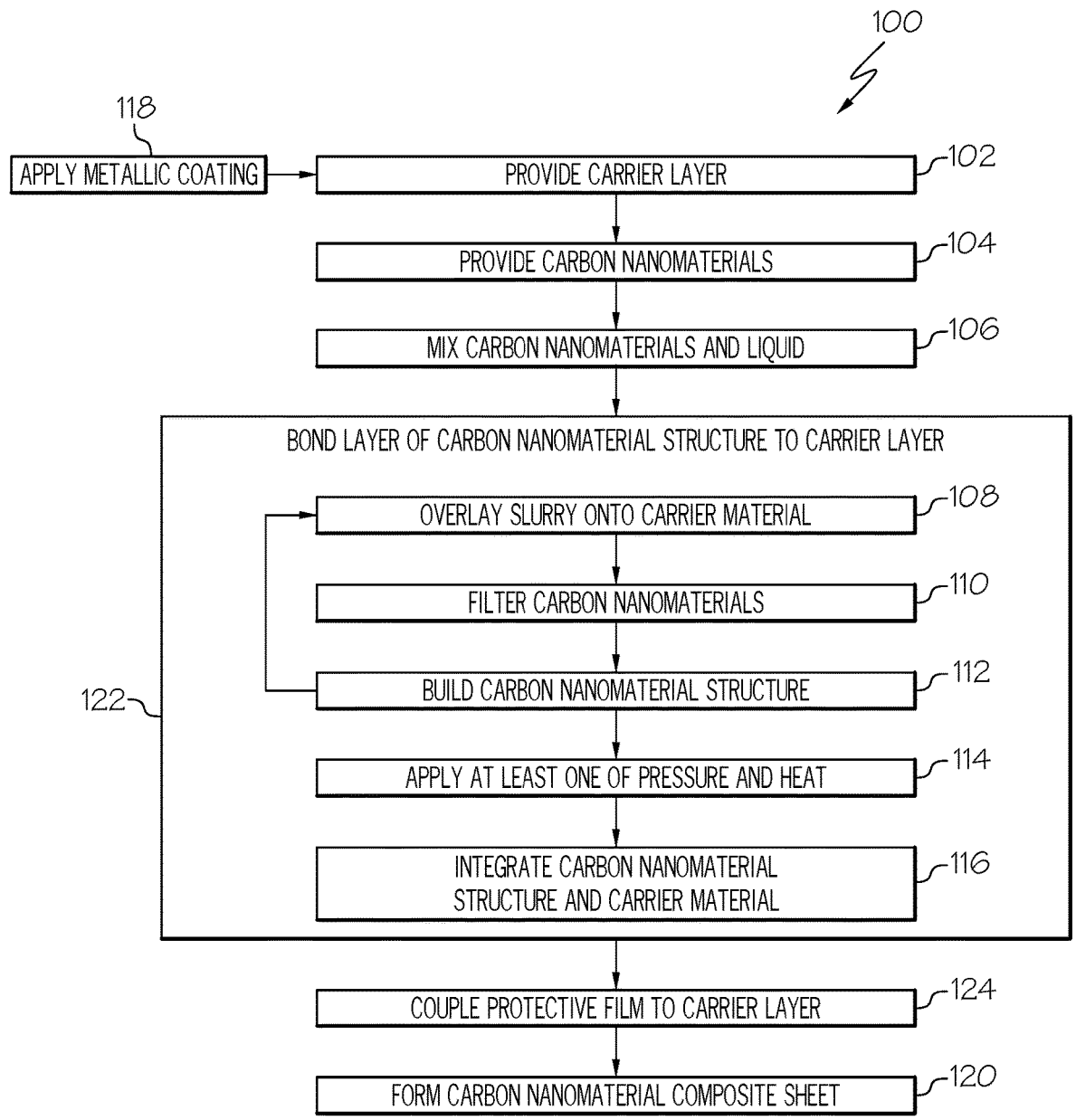
FIG. 1 is a flow diagram of one example of the disclosed method for making the disclosed carbon nanomaterial composite sheet.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Figure 3:
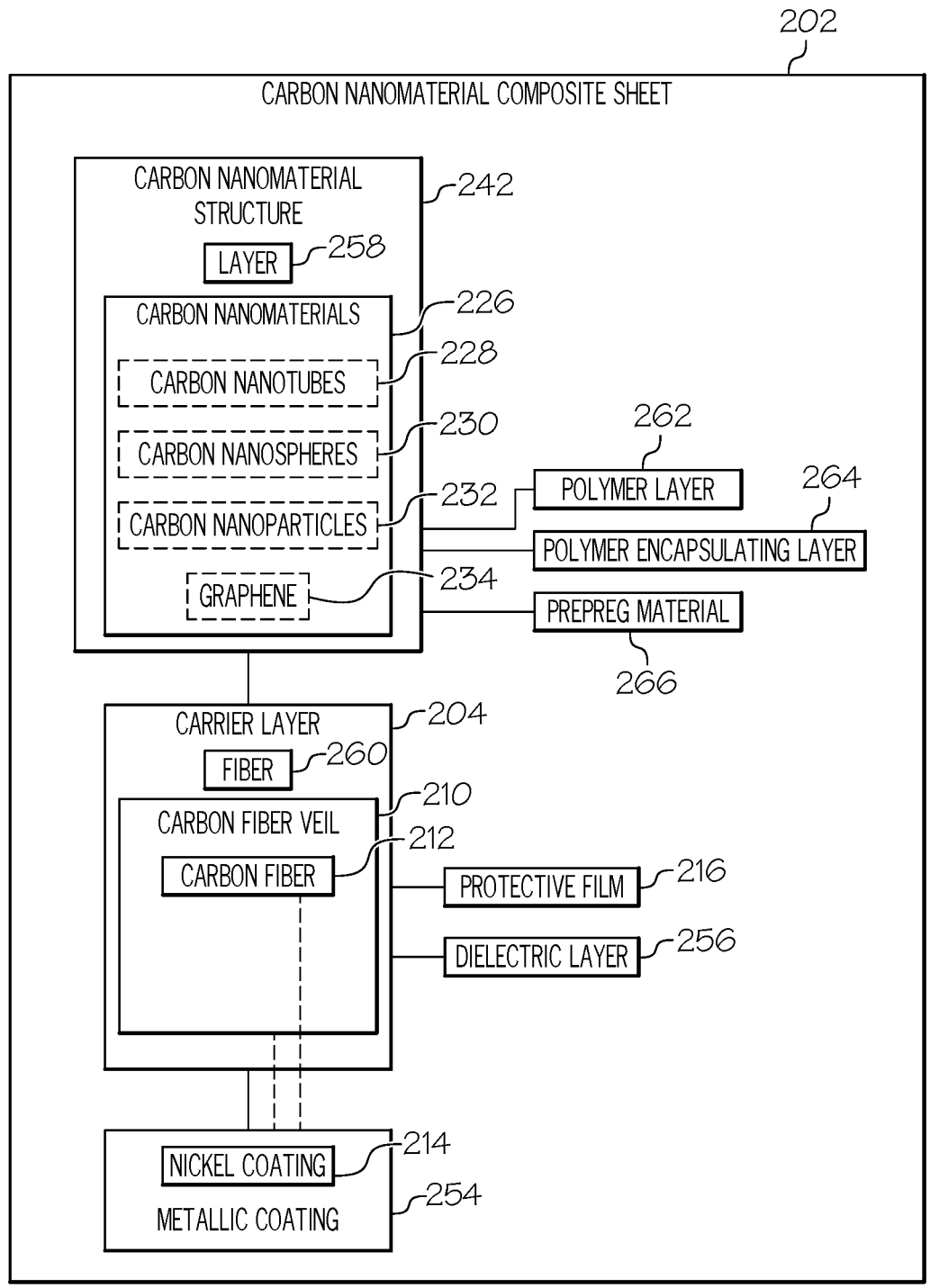
FIG. 3 is a schematic block diagram of one example of the disclosed carbon nanomaterial composite sheet.
Figure 8:
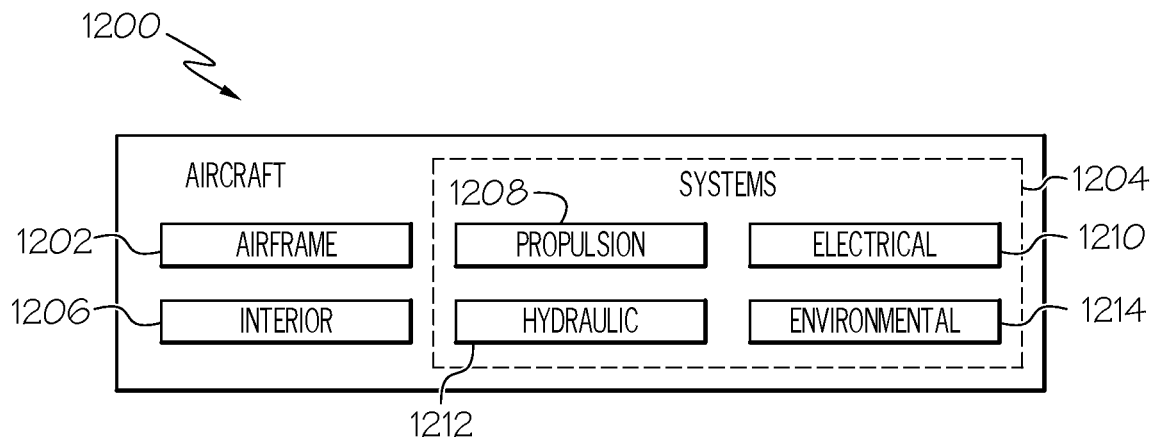
FIG. 8 is a schematic illustration of an aircraft.

In FIGS. 3 and 8, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples disclosed by the present disclosure. Likewise, elements and/or components, if any, represented with dashed lines, indicate alternative examples disclosed by the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 3 and 8 may be combined in various ways without the need to include other features described in FIGS. 3 and 8, other drawing figures, and/or the accompanying disclosure, even though such combination or combinations are not explicitly illustrated herein. Similarly, additional features not limited to the examples presented, may be combined with some or all of the features shown and described herein.

Figure 7:
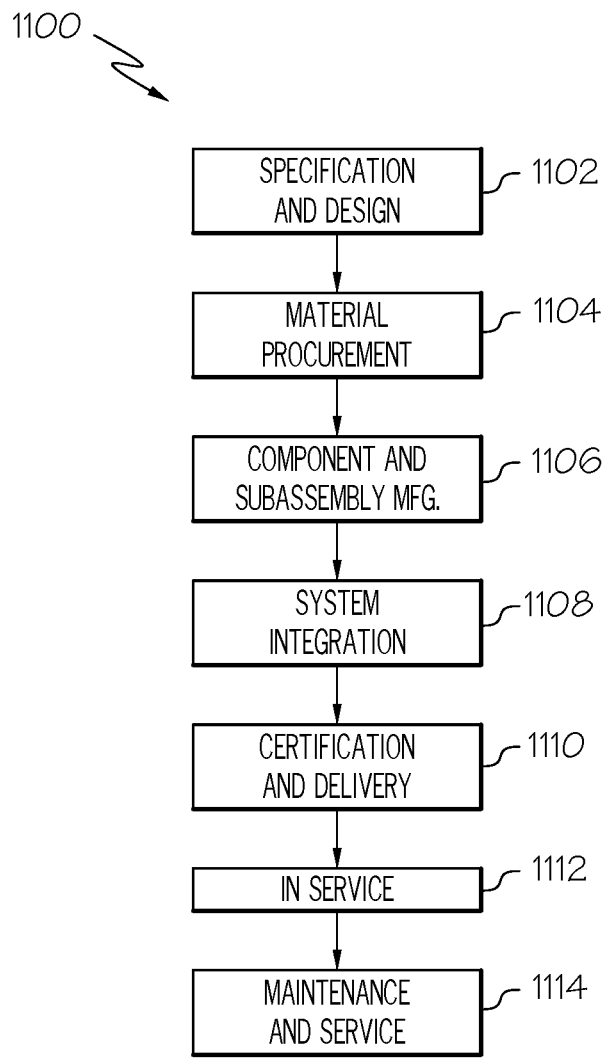
FIG. 7 is a block diagram of aircraft production and service methodology.

In FIGS. 1 and 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 1 and 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Figure 2:
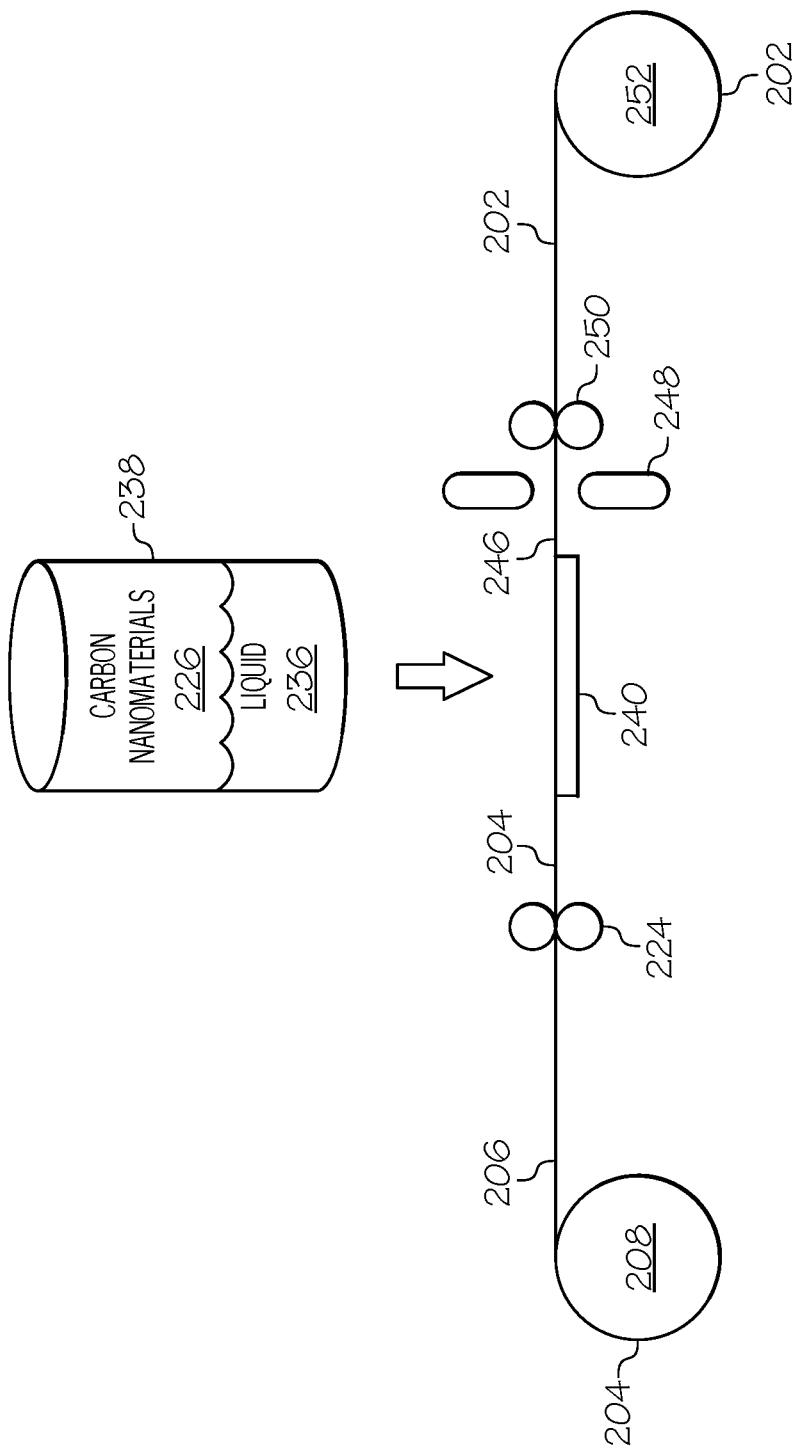
FIG. 2 is a schematic illustration of one example of the disclosed system for making the disclosed carbon nanomaterial composite sheet.

Referring to FIG. 1, one example of method 100 is disclosed. Method 100 is one example implementation of the disclosed method for making a multifunctional carbon nanomaterial composite sheet 202. As illustrated in FIG. 2, system 200 is one example implementation of the disclosed system for making carbon nanomaterial composite sheet 202, for example, according to method 100. Modifications, additions, or omissions may be made to method 100 without departing from the scope of the present disclosure. Method 100 may include more, fewer, or other steps. Additionally, steps may be performed in any suitable order.

Referring to FIG. 1, and with reference to FIG. 3, in one example, method 100 includes the step of bonding layer 258 (e.g., one or more layers) of carbon nanomaterial structure 242 to carrier layer 204, as shown at block 122. In one example, carrier layer 204 is fabricated from a porous metalized nonwoven material. In one example, layer 258 of carbon nanomaterial structure 242 is permanently bonded to carrier layer 204.

Figure 4:
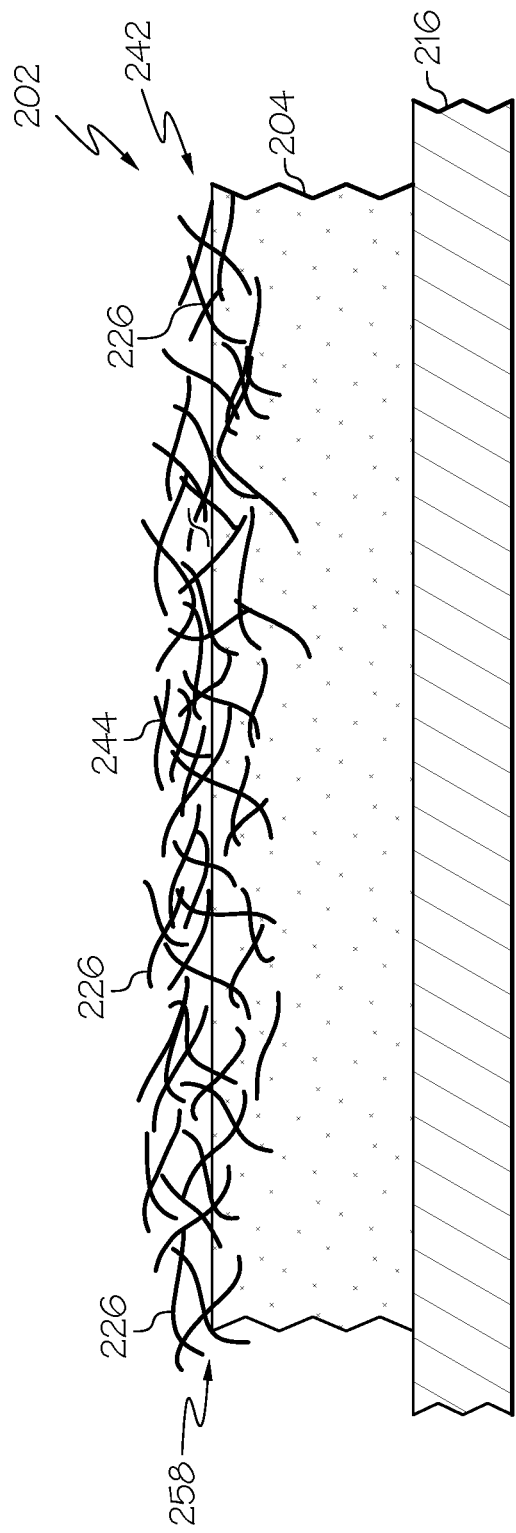
FIG. 4 is a schematic partial view, in section, of one example of the disclosed carbon nanomaterial composite sheet.

In one example, method 100 includes the step of coupling releasable protective film 216 to carrier layer 204, as shown at block 124. In one example, carrier layer 204 is located between protective film 216 and carbon nanomaterial structure 242 (e.g., layer 258 of carbon nanomaterial structure 242, as illustrated in FIG. 4.

Referring to FIG. 1, and with reference to FIG. 3, in one example implementation, method 100 includes the step of providing carrier layer 204, as shown at block 102. Generally, carrier layer 204 includes any material upon which carbon nanomaterials 226 may be overlayed to form (e.g., build and/or bond) carbon nanomaterial structure 242 on a surface of carrier layer 204. Carrier layer 204 may also be referred to as a carrier material, a material layer, a filter layer, or a filtering layer. As one general example, carrier layer 204 includes any porous material to which carbon nanomaterials 226 (e.g., slurry 238 of carbon nanomaterials 226) can be filtered through. The porous material may include an aperture or porous film, sheet, veil, or fabric material (e.g., a material having a plurality of apertures or opening through which slurry 238 is filtered). Carrier layer 204 may be conductive or non-conductive depending on a particular application and/or desired properties. Non-limiting examples include woven or nonwoven (e.g., wet-laid or melt spun) nylon, polyester, PEEK, PEKK, fiberglass, carbon fiber, metallized polymer, or metal meshes/foils (e.g., expanded copper foil).

Referring to FIG. 3, in one example, carbon nanomaterial composite sheet 202 includes layer 258 of carbon nanomaterial structure 242, and carrier layer 204. In one example, carrier layer 204 includes a porous metalized nonwoven material. In one example, carrier layer 204 is bonded to carbon nanomaterial structure 242.

Referring to FIG. 3, as one example, carbon nanomaterial composite sheet 202 is a laminate. As one example, carbon nanomaterial composite sheet 202 is a continuous sheet. As one example, carrier layer 204 is permanently bonded to the carbon nanomaterial structure 242 (e.g., to layer 258 of carbon nanomaterial structure 242). As one example, carbon nanomaterial structure 242 includes a randomly oriented, uniformly distributed structure of carbon nanotubes ("CNTs") 228. As one specific, non-limiting example, carbon nanomaterial structure 242 has a basis weight of approximately 1 gram of carbon nanomaterial 226 per square meter (gsm). As another specific, non-limiting example, carbon nanomaterial structure 242 has a basis weight of at least 1 gram of carbon nanomaterial 226 per square meter (gsm). In one example, carbon nanomaterial composite sheet 202 includes at least one polymer layer 262 coupled to carbon nanomaterial structure 242. In another example, carbon nanomaterial composite sheet 202 includes at least one polymer encapsulating layer 264 coupled to carbon nanomaterial structure 242. As one example, carbon nanomaterial composite sheet 202 includes prepreg material 266 coupled to carbon nanomaterial structure 242.

Referring to FIG. 2, and with reference to FIG. 3, on one example implementation, and as illustrated in FIG. 2, carrier layer 204 may be provided as (or take the form of) a continuous sheet of carrier layer 204 (generally referred to herein as sheet 206). As used here, "continuous" means an elongated sheet having a length that is orders of magnitude greater than a width. Generally, sheet 206 may be or may include a continuous cloth; fabric; veil; non-woven sheet, ply, or mat; woven sheet, ply, or mat; and the like. Carrier layer 204 may be porous. Carrier layer 204 may be conductive or non-conductive. As illustrated in FIG. 2, as one example, system 200 may include a roll of carrier layer 204 (generally referred to herein as roll 208). For instance, a continuous sheet 206 may be fabricated and rolled into roll 208.

Referring to FIG. 3, and with reference to FIGS. 2 and 4, as one general, non-limiting example, carrier layer 204 may be (or may take the form of) a porous, non-woven veil, sheet, ply, or mat of conductive material. As one general example, carrier layer 204 may include fiber 260 looped together to form a thin non-woven sheet, ply, or mat. As one specific, non-limiting example, carrier layer 204 (e.g., conductive carrier material) is (or takes the form of) carbon fiber veil 210. Thus, sheet 206 (FIG. 2) may be a continuous sheet of carbon fiber veil 210. Carbon fiber veil 210 includes carbon fiber 212 (e.g., a plurality of continuous strands of carbon fibers) that are randomly looped together to form a thin non-woven sheet, ply, or mat of carbon fibers 212. Carbon fiber veil 210 may be porous. Carbon fiber veil 210 may also be conductive. In certain example implementations, carbon fibers 212 may be held together with a light binder (not explicitly illustrated).

As another general, non-limiting example, carrier layer 204 may be (or may take the form of) a porous, non-woven veil, sheet, ply, or mat of non-conductive material. As specific, non-limiting examples, carrier layer 204 (e.g., non-conductive carrier material) may be (or may take the form of) a porous, non-woven veil, sheet, ply, or mat of glass fibers (e.g., E-glass, S-glass), aramid fibers (e.g., Kevlar), fluoropolymer fibers (e.g., Ultra High Molecular Weight Polyethylene, High Density Polyethylene, Teflon, etc.) or a combination thereof.

As another general, non-limiting example, carrier layer 204 may be (or may take the form of) a porous, non-woven veil, sheet, ply, or mat of dielectric material (e.g., a dielectric veil) (not explicitly illustrated). As specific, non-limiting examples, carrier layer 204 (e.g., dielectric carrier material) includes, but is not limited to, Ultra High Molecular Weight Polyethylene ("UHMWPE"), fluoropolymers, polyimides, or a combination thereof.

The particular materials used for carrier layer 204 may depend, at least in part, on the particular application and/or function of the disclosed carbon nanomaterial composite sheet 202, such as, but not limited to, electromagnetic interference ("EMI") shielding, lightning protection, environmental protection, environmental isolation, scratch resistance, etc. As one example, when a higher conductivity of carbon nanomaterial composite sheet 202 is desired or required, for example, for lightning strike protection and/or low frequency shielding effectiveness, carrier layer 204 may be made from a conductive material, for example, carbon fibers 212 (e.g., carbon fiber veil 210). As another example, when a lower conductivity of carbon nanomaterial composite sheet 202 is desired or required, carrier layer 204 may be made from a non-conductive material, for example, glass, aramid, and/or fluoropolymer fibers.

Referring to FIG. 3, in one example, carrier layer 204 includes a nickel-coated fiber (fiber 260 coated with nickel coating 214). Thus, in one example, carrier layer 204 includes metallic coating 254. Carrier layer 204 including metallic coating 254 may also be referred to as a metallic coated carrier layer, a metalized carrier layer, a metallic coated carrier material, a metalized carrier material, a metallic coated material layer, a metalized material layer, a metallic coated filter layer, a metalized filter layer, a metallic coated filtering layer, a metalized filtering layer, a metallic coated fiber layer, or a metalized fiber layer. As one specific, non-limiting example, metallic coating 254 is nickel coating 214. Carrier layer 204 including nickel coating 214 may also be referred to as a nickel ("Ni")-coated carrier layer, a nickel ("Ni")-metalized carrier layer, a nickel-coated carrier material, a nickel-metalized carrier material, a nickel coated material layer, a nickel-metalized material layer, a nickel coated filter layer, a nickel-metalized filter layer, a nickel coated filtering layer, a nickel-metalized filtering layer, a nickel coated fiber layer, or a nickel-metalized fiber layer.

Other metals besides nickel may also be used as metallic coating 254. The particular metal used for metallic coating 254 may be selected, for example, based on a desired shielding effectiveness.

Referring to FIG. 1 and with reference to FIG. 3, in one example implementation, method 100 may include the step of applying metallic coating 254 (e.g., nickel coating 214) to carrier layer 204, as shown at block 118 (FIG. 2). Metallic coating 254 (e.g., nickel coating 214) may be applied to carrier layer 204 by a variety of known processes or techniques. In one example implementation, nickel (nickel coating 214) may be applied to carrier layer 204 by a chemical vapor deposition process. In another example implementation, nickel may be applied to carrier layer 204 by an electroless nickel plating process. In yet another example implementation, nickel may be applied to carrier layer 204 by a nickel electroplating process.

As one example, carbon fiber veil 210 includes metallic coating 254 (e.g., nickel coating 214). Carbon fiber veil 210 including metallic coating 254 may also be referred to as a metallic coated carbon fiber veil or a metalized carbon fiber veil. As one example, nickel may be applied to carbon fiber veil 210 to form a nickel coated carbon fiber veil. Carbon fiber veil 210 including nickel coating 214 may also be referred to as a nickel coated carbon fiber veil or a nickel-metalized carbon fiber veil. Metallic coating 254 (e.g., nickel coating 214) may be applied to carbon fiber veil 210 by a variety of known processes or techniques. As examples, nickel (nickel coating 214) may be applied to carbon fiber veil 210 by a chemical vapor deposition process, an electroless nickel plating process, or a nickel electroplating process.

As one example, fiber 260 includes metallic coating 254 (e.g., nickel coating 214. As one example, metal (e.g., nickel) may be applied to individual ones of fiber 260 to form metal (e.g., nickel) coated fiber. The nickel coated fiber may be used to form fiber veil, sheet, ply, or mat (e.g., nickel coated veil, sheet, ply, or mat). An another example, carbon fiber 212 includes metallic coating 254 (e.g., nickel coating 214). As one example, metal (e.g., nickel) may be applied to individual ones of carbon fiber 212 to form metal (e.g., nickel) coated carbon fibers. The nickel coated carbon fiber may be used to form carbon fiber veil 210 (e.g., nickel coated carbon fiber veil). Metallic coating 254 (e.g., nickel coating 214) may be applied to fiber 260 or carbon fiber 212 by a variety of known processes or techniques. As examples, nickel may be applied to fiber 260 or carbon fiber 212 by a chemical vapor deposition process, an electroless nickel plating process, or a nickel electroplating process.

As one example, a non-conductive carrier material or a dielectric carrier material (e.g., carrier layer 204 made from a non-conductive material or dielectric material) includes metallic coating 254 (e.g., nickel coating 214). Application of metallic coating 254 (e.g., nickel coating 214) to the non-conductive carrier material or the dielectric carrier material may provide or essentially create a conductive carrier layer 204. For example, metal (e.g., nickel) may be applied to the non-conductive carrier material or the dielectric carrier material to form a metal coated (e.g., nickel coated) carrier material. Metallic coating 254 (e.g., nickel coating 214) may be applied to the non-conductive carrier material or the dielectric carrier material by a variety of known processes or techniques. As examples, nickel may be applied to the non-conductive carrier material or the dielectric carrier material by a chemical vapor deposition process, an electroless nickel plating process, or a nickel electroplating process.

Referring to FIG. 2, in one example, system 200 may include one or more first rollers 224. First rollers 224 may be guide rollers, nip rollers, pinch rollers or the like configured to pull, for example, sheet 206, of carrier layer 204 (e.g., carbon fiber veil 210) off of roll 208 and direct or guide carrier layer 204 along a processing path.

Referring to FIG. 1, and with reference to FIGS. 2 and 3, in one example implementation, method 100 includes the step of providing carbon nanomaterials 226, as shown at block 104. Carbon nanomaterials 226 may take various forms. As illustrated in FIG. 3, as one general, non-limiting example, carbon nanomaterials 226 may be (or take the form of) carbon nanoparticles 232 having various geometries. As one specific, non-limiting example, carbon nanomaterials 226 may be (or take the form of) carbon nanotubes 228. As one specific, non-limiting example, carbon nanomaterials 226 may be (or take the form of) carbon nanospheres 230. As one specific, non-limiting example, carbon nanomaterials 226 may be (or take the form of) graphene 234. As one specific, non-limiting example, carbon nanomaterials 226 may be at least one of or a combination of carbon nanoparticles 232, carbon nanotubes 228, carbon nanospheres 230, and/or graphene 234. Carbon nanomaterials 226 may also include various other allotropes of carbon.

Various known chemical processes may be used to create carbon nanomaterials 226. For example, various types of carbon nanotubes 228, manufactured in accordance with known techniques, may be used as carbon nanomaterials 226. In one example implementation, carbon nanotubes 228 may be grown on a stainless steel sheet. Grown carbon nanotubes 228 may then be scraped away from the sheet.

As one example, carbon nanotubes 228 may be single wall carbon nanotubes ("SWCNTs"). As another example, carbon nanotubes 228 may be multiwall carbon nanotubes ("MWCNTs"). As another example, carbon nanotubes 228 may be prestressed multiwall carbon nanotubes ("PSMW-CNTs"). As yet another example, carbon nanotubes 228 may be a combination of SWCNTs, MWCNTs, and/or PSMW-CNTs. PSMWCNTs may be made in accordance with known techniques. As one example, PSMWCNTs may be achieved by putting MWCNTs into a bomb chamber and using an explosion to rapidly increase the pressure to force the walls of the MWCNTs to compress to within a distance where van der Waals forces dominate. As one example, PSMWCNTs may be achieved by exposing MWCNTs to radiation to increase pressure. In one particular, non-limiting example, PSMWCNTs may have an interwall spacing ranging from approximately 0.22 nm to approximately 0.28 nm (e.g., compared to approximately 0.34 nm for conventional MWCNTs). Benefits offered by PSMWCNTs may include enhanced interwall shear strengths, which in turn improve load-transfer capabilities compared to those of normal MWCNTs. This provides axial tensile strength and Young's modulus that are approximately 20 percent higher than those of normal carbon nanotubes ("CNTs").

Referring to FIG. 1, and with reference to FIG. 2, in one example implementation, method 100 includes the step of mixing carbon nanomaterials 226 and liquid 236 to form a slurry of carbon nanomaterials 226 and liquid 236 (generally referred to herein as slurry 238) (e.g., a fluid mixture or suspension of carbon nanomaterials 226 suspended in liquid 236), as shown at block 106. Liquid 236 may be any suitable dispersive liquid or fluid carrier material into which carbon nanomaterials 226 may be dispersed and suspended. Generally, liquid 236 may be non-reactive with carbon nanomaterials 226 (e.g., carbon nanomaterials 226 are insoluble in liquid 238). As one specific, non-limiting example, liquid 236 may be water. As another specific, non-limiting example, liquid 236 may be an organic solvent. As another specific, non-limiting example, liquid 236 may be an acid. As another specific, non-limiting example, liquid 236 may be a resin (e.g., a thermoplastic or epoxy). Other examples of a suitable dispersive liquid (e.g., liquid 236) are also contemplated. Liquid 236 may also include one or more compounds for improving and/or stabilizing the dispersion and suspension of carbon nanomaterials 226 in liquid 236.

Referring to FIG. 1, and with reference to FIGS. 2 and 3, in one example implementation, method 100 includes the step of overlaying (e.g., dispensing) slurry 238 of carbon nanomaterials 226 and liquid 236 over carrier layer 204, as shown at block 108. Method 100 includes the step of filtering carbon nanomaterials 226 by carrier layer 204, as shown at block 110. Method 100 includes the step of forming (e.g., building) carbon nanomaterial structure 242 (FIG. 3) on a surface of carrier layer 204, as shown at block 112. The combination of carbon nanomaterial structure 242 bonded to (e.g., formed on and coupled to) carrier layer 204 may be referred to herein, and illustrated in FIG. 2, as carbon nanomaterial precursor composite sheet 246.

Referring to FIG. 2, and with reference to FIG. 3, in one example, system 200 includes forming table 240. Interaction between carbon nanomaterials 226 and carrier layer 204 to build carbon nanomaterial structure 242 (FIG. 3) occurs on forming table 240. In one example implementation, forming table 240 may include a wire mesh or screen sufficient to support carrier layer 204 when slurry 238 is dispensed (e.g., poured, sprayed, etc.) over carrier layer 204. As slurry 238 is overlayed (e.g., poured) over carrier layer 204, slurry 238 spreads out over the surface of carrier layer 204. Liquid 236 passes through carrier layer 204 and carbon nanomaterials 226 are filtered (e.g., sifted out and retained) by carrier layer 204 (e.g., on and/or at least partially below the surface of carrier layer 204) to form carbon nanomaterial structure 242. In one example implementation, carrier layer 204 is supported on a conveyer (e.g., a conveyor belt) (not explicitly illustrated), which carries carrier layer 204 along the processing path. The conveyor may be a wire mesh or screen sufficient to support carrier layer 204 in a plane as slurry 238 is dispensed over and filtered by carrier layer 204. In one example, system 200 (e.g., forming table 240) may also include a vacuum zone configured to provide a vacuum pressure sufficient to draw slurry 238 from above (e.g., from an upper surface of) carrier layer 204 and through carrier layer 204, while allowing carbon nanomaterials 226 to entangle upon the surface and settle into (e.g., at least partially disperse through) carrier layer 204. Carbon nanomaterials 226 may be randomly oriented and uniformly-distributed upon carrier layer 204 following the filtering step (block 110).

Referring to FIGS. 3 and 4, and with reference to FIGS. 1 and 2, in one example, at least some of carbon nanomaterials 226 are interspersed through a thickness of carrier layer 204 and are entangled with carrier layer 204 such that carbon nanomaterial structure 242 is permanently bonded to carrier layer 204, as illustrated in FIG. 4. In one example implementation, during the overlaying step (block 108) and the filtering step (block 110) (FIG. 1) of slurry 238 (FIG. 2), carbon nanomaterials 226 may become entangled with each other in multiple directions to form carbon nanomaterial structure 242 (e.g., a buildup of carbon nanomaterials 226) on the surface of carrier layer 204 (block 112). Thus, carbon nanomaterial structure 242 is a sheet structure that includes an entangled network of carbon nanomaterials 226 (e.g., a carbon nanoparticle structure includes an entangled network of carbon nanoparticles 232, a carbon nanotube structure includes an entangled network of carbon nanotubes 228, a carbon nanosphere structure includes an entangled network of carbon nanospheres 230, or a graphene structure includes an entangled network of graphene 234). Carbon nanomaterials 226 may be randomly distributed or oriented on the surface of carrier layer 204. Alternatively, carbon nanomaterials 226 may be uniformly distributed or oriented on the surface of carrier layer 204.

As one specific, non-limiting example implementation, carrier layer 204 (e.g., carbon fiber veil, nickel coated carbon fiber veil, etc.) moves along the processing path (not explicitly identified) of system 200, for example, on the conveyor. Carbon nanomaterials 226 may be applied as slurry 238 of liquid 236 and carbon nanomaterials 238 (e.g., carbon nanotubes 228, carbon nanospheres 230, carbon nanoparticles 232, graphene 234) upon carrier layer 204. The speed at which carrier layer 204 (e.g., the conveyer) moves may be controlled to provide a uniform distribution of slurry 238, and, thus, carbon nanomaterials 226, across the underlying carrier layer 204.

The density of carbon nanomaterials 226 built up to form carbon nanomaterial structure 242 may depend upon various factors including, but not limited to, the size and/or geometry of carbon nanomaterials 226, the type of carbon nanomaterials 226, a particular application of carbon nanomaterial structure 242 (e.g., a desired shielding effectiveness or attenuation at particular RF frequencies, a desired level of lightning strike protection, a desired conductivity level, a desired surface resistivity, and the like), a desired thickness of carbon nanomaterial structure 242, a desired weight of carbon nanomaterial structure 242, and the like. As one specific, non-limiting example, carbon nanomaterials 226 may have a basis weight of approximately 1 gram per square meter (gsm). As one specific, non-limiting example, carbon nanomaterials 226 may have a relative density of less than approximately 1.0. As illustrated in FIG. 1, the dispensing (block 108) and filtering (block 110) steps may be repeated as needed to build carbon nanomaterial structure 242.

Referring to FIG. 4, as one example, entanglement between carbon nanomaterials 226 may occur at various crossover locations 244 between different ones of carbon nanomaterials 226. The network of entangled carbon nanomaterials 226 may include a sufficient amount of carbon nanomaterials 226 to provide a sufficient number of crossover locations 244 to achieve a stable carbon nanomaterial structure 242.

Depending upon the type and/or geometry of carbon nanomaterials 226 (e.g., carbon nanotubes, 228, carbon nanospheres 230, carbon nanoparticles 232, graphene 234, etc.), the size of carbon nanomaterials 226 may vary. As one specific, non-limiting example, carbon nanotubes 228 may have an extremely high aspect ratio (length to diameter ratio), for example, of at least 2,500:1. For instance, carbon nanotubes 228 may have a length ranging from approximately 0.5 millimeter to approximately 4 millimeters and a diameter ranging from approximately 1 nanometer to approximately 50 nanometers. Other suitable dimensions of carbon nanomaterials 226 are also contemplated without limitation.

Due to the small size of carbon nanomaterials 226, at least some carbon nanomaterials 226 may at least partially disperse and integrate throughout carrier layer 204. For example, at least some carbon nanomaterials 226 may penetrate and intersperse at least partially through a thickness (e.g., a through-thickness) (not explicitly identified) of carrier layer 204 and entangle and integrate with carrier layer 204. Accordingly, carbon nanomaterial structure 242 is effectively coupled to carrier layer 204 (e.g., forming carbon nanomaterial precursor composite sheet 246) following the filtering (block 110) and building (block 112) steps of method 100 (FIG. 1). As one example, carbon nanomaterials 226 may be concentrated proximate (e.g., at or near) the surface of carrier layer 204. As one example, carbon nanomaterials 226 may be partially interspersed and entangled throughout the thickness of carrier layer 204. As one example, carbon nanomaterials 226 may be completely interspersed and entangled throughout the thickness of carrier layer 204.

Referring to FIG. 1, and with reference to FIG. 2, in one example implementation, method 100 includes the step of applying at least one of pressure and heat to carbon nanomaterial precursor composite sheet 246 (e.g., applying at least one of pressure and heat to the coupled combination of carbon nanomaterial structure 242 and carrier layer 204), as shown at block 114, integrating carbon nanomaterial structure 242 and carrier layer 204, as shown at block 116, and forming carbon nanomaterial composite sheet 202, as shown at block 120. The step of applying at least one of pressure and heat to carbon nanomaterial precursor composite sheet 246 (e.g., to carbon nanomaterial structure 242 and carrier layer 204) may also be referred to as laminating. As one example, applying heat may include drying carbon nanomaterial precursor composite sheet 246. For example, heat may be applied to carbon nanomaterial precursor composite sheet 246 sufficient to dry (e.g., evaporate) any remaining liquid 236 from carrier layer 204 and/or carbon nanomaterial structure 242. As one general, non-limiting example, carbon nanomaterial precursor composite sheet 246 may be heated to between approximately 200° F. and approximately 300° F. (e.g., 220° F.) to remove liquid 236 and dry carbon nanomaterial precursor composite sheet 246 and form carbon nanomaterial composite sheet 202. As one example, applying pressure may include compressing carbon nanomaterial precursor composite sheet 246. For example, pressure may be applied to carbon nanomaterial precursor composite sheet 246 sufficient to compress carbon nanomaterial precursor composite sheet 246 and form carbon nanomaterial composite sheet 202. As one general, non-limiting example, carbon nanomaterial precursor composite sheet 246 may be compressed from a thickness of approximately 8 mils to form carbon nanomaterial composite sheet 202 having a thickness of approximately 6 mils (e.g., 6.3 mils). Applying heat, pressure, or a combination thereof further bonds and integrates carbon nanomaterial structure 242 and carrier layer 204 together. The pressure and/or heat applied to carbon nanomaterial precursor composite sheet 246 (e.g., by nip rollers 250) may be uniform and aids in creating a uniform and unitary carbon nanomaterial composite sheet 202.

Referring to FIG. 2, and with reference to FIG. 1, system 200 may include one or more dryers 248 (e.g., to apply heat) and/or one or more second rollers 250 (e.g., to apply pressure or pressure and heat). Dryers 248 may be located proximate (e.g., near) carbon nanomaterial precursor composite sheet 246 along the processing path following forming table 240 and are configured to dry carbon nanomaterial precursor composite sheet 246 (e.g., remove liquid 236 remaining in carbon nanomaterial precursor composite sheet 246) and form carbon nanomaterial composite sheet 202. Second rollers 250 may be guide rollers, nip rollers, pinch rollers or the like configured to pull, direct or guide carbon nanomaterial precursor composite sheet 246 along the processing path. Second rollers 250 may also be configured to compress carbon nanomaterial precursor composite sheet 246 and form carbon nanomaterial composite sheet 202. Second rollers 250 may be heated rollers configured to increase the temperature of carbon nanomaterial precursor composite sheet 246, for example, to dry carbon nanomaterial precursor composite sheet 246 while carbon nanomaterial precursor composite sheet 246 is being compressed by second rollers 250. While only a single opposed pair of second rollers 250 is illustrated in FIGS. 2 and 5 by example, those skilled in the art will recognize that multiple pairs of second rollers 250 may be disposed along the processing path to incrementally compress (e.g., by between approximately 0.5 mil to approximately 1.0 mil) in multiple stages.

Applying pressure and/or heat to carbon nanomaterial precursor composite sheet 246 (e.g., combination of carbon nanomaterial structure 242 and carrier layer 204) (block 114) may further intersperse and integrate carbon nanomaterials 226 with carrier layer 204, for example, bonding carbon nanomaterial structure 242 and carrier layer 204 together (block 122).

Following the applying of pressure and/or heat step (block 114) (FIG. 1), carbon nanomaterial composite sheet 202 may be rolled into a roll of carbon nanomaterial composite sheet 202 (generally referred to herein as roll 252).

Figure 5:
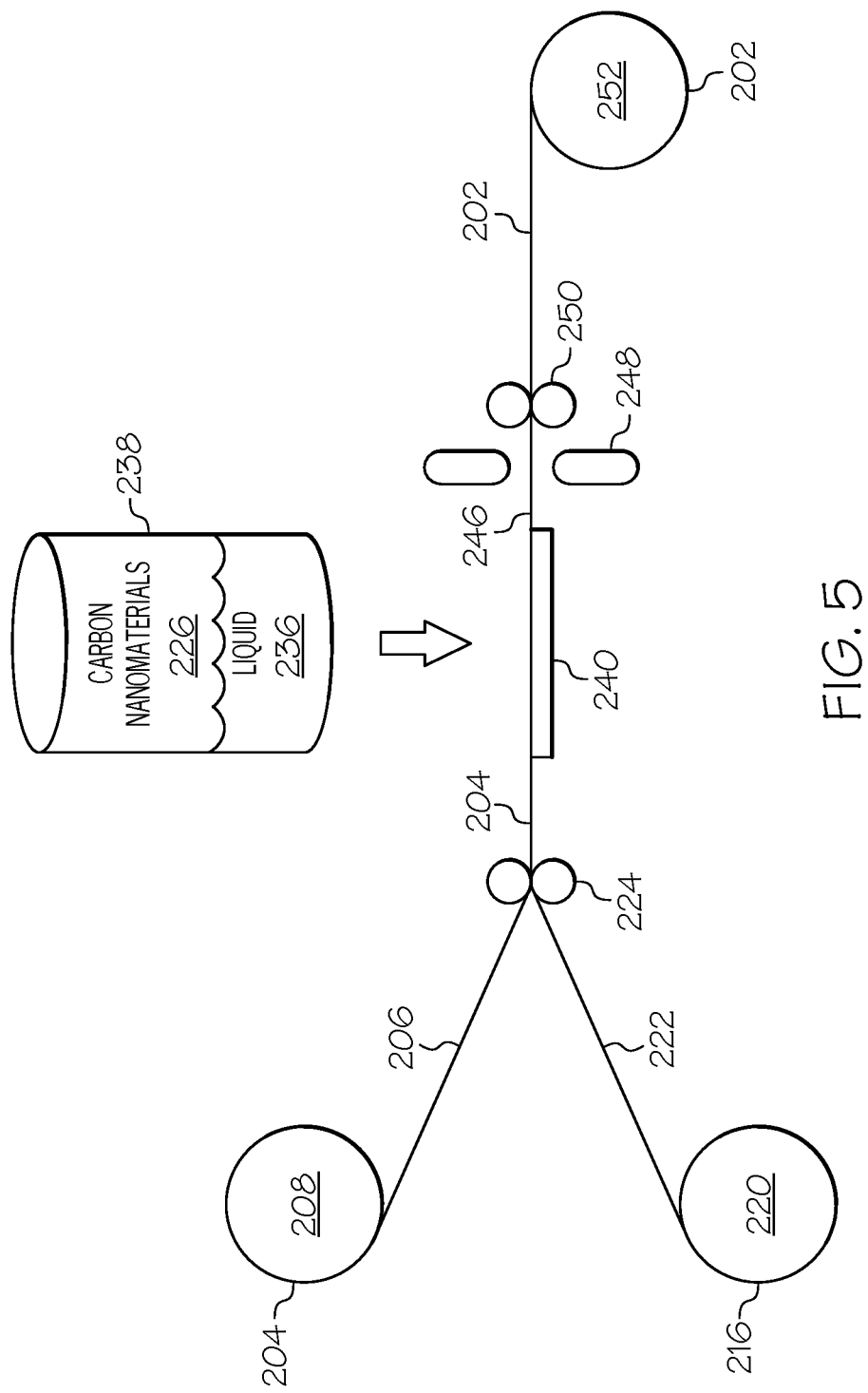
FIG. 5 is a schematic illustration of one example of the disclosed system for making the disclosed carbon nanomaterial composite sheet.
Figure 6:
FIG. 6 is a schematic block diagram of one example of the disclosed composite structure including the disclosed carbon nanomaterial composite sheet.

Referring to FIG. 5, and with reference to FIG. 4, in one example implementation, carrier layer 204 may also include protective film 216. Protective film 216 may protect carbon nanomaterial composite sheet 202, for example, when rolled into roll 252. Protective film 216 is removed from carbon nanomaterial composite sheet 202 prior to use of carbon nanomaterial composite sheet 202 in a particular application, for example, when used to make composite structure 300 (FIG. 6). Protective film 216 may also be referred to as a protective layer or release film.

As one example, protective film 216 may be provided as (or take the form of) a sheet of protective film 216 (generally referred to herein as sheet 222). As one specific, non-limiting example, protective film 216 may be made of a polytetrafluoroethylene glass material, such as ARMA-LON™ polytetrafluoroethylene glass laminate.

As one example, system 200 may include a continuous sheet 222 rolled into a roll of protective film 216 (generally referred to herein as roll 220). As one example, protective film 216 may be releasably coupled to carrier layer 204 (e.g., carbon fiber veil 210).

First rollers 224 may be configured to pull carrier layer 204 of off roll 208 and protective film 216 off of roll 220 and direct or guide carrier layer 204 and protective film 216 along the processing path. First rollers 224 may also be configured compress sheet 206 and sheet 222 into intimate contact.

Figure 9:
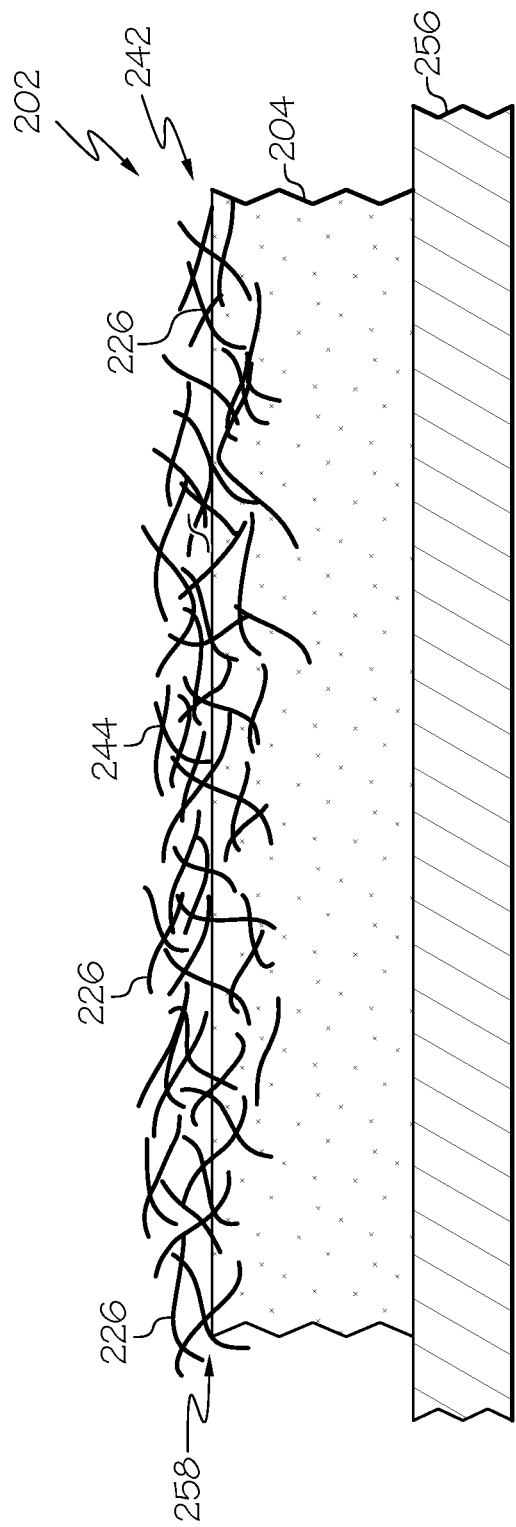
FIG. 9 is a schematic partial view, in section, of one example of the disclosed carbon nanomaterial composite sheet.

Referring to FIG. 9, in one example, carbon nanomaterial composite structure 202 may include dielectric layer 256. Dielectric layer 256 may be coupled to carrier layer 204. As one example, dielectric layer 256 may be applied to carrier layer 204 before the overlaying step of slurry 238 of carbon nanomaterials 226 and liquid 236 (block 108). As illustrated in FIG. 9, carrier layer 204 may be disposed between dielectric layer 256 and carbon nanomaterial structure 242. As one example, application of dielectric layer 256 to carrier layer 204 may be similar to the process described herein above with reference to application of protective film 216. However, dielectric layer 256 may not be removed from carrier layer 204. In one example, carbon nanomaterial composite structure 202 may include dielectric layer 256 and protective film 216 applied to carrier layer 204. For example, protective film 216 may be applied (e.g., releasably coupled) to dielectric layer 256 (e.g., dielectric layer 256 is disposed between carrier layer 204 and protective film 216. Dielectric layer 256 may be porous or non-porous (e.g., may be made from a porous material or a non-porous material).

Referring to FIG. 6, one example of composite structure 300 is disclosed. In one example, composite structure 300 includes at least one fiber-reinforced polymer layer 302 and carbon nanomaterial composite sheet 202. Carbon nanomaterial composite sheet 202 may include layer 258 of carbon nanomaterial structure 242, and carrier layer 204. Carrier layer 204 may include a porous metalized nonwoven material. Carrier layer 204 may be bonded to carbon nanomaterial structure 242. In one example, carrier layer 204 may be permanently bonded to carbon nanomaterial structure 242. In one example, carbon nanomaterial composite sheet 202 is a laminate. In one example, carbon nanomaterial structure 242 may include a randomly oriented, uniformly distributed structure of carbon nanotubes 228 (or other types carbon nanomaterials 226).

Thus, in one example, composite structure 300 may be a composite laminate. As one example, composite structure 300 may include one or more fiber-reinforced polymer layers 302 (e.g., three fiber-reinforced polymer layers 302 are illustrated in the example of FIG. 6). Each one of fiber-reinforced polymer layers 302 may include a sheet, mat, or ply of reinforcing fibrous material (not explicitly illustrated) bonded together by a polymer matrix (not explicitly illustrated). The fibrous material may include any suitable woven or nonwoven (e.g., knit, braided or stitched) continuous reinforcing fibers or filaments. The polymer matrix material may include any suitable thermoset resin (e.g., epoxy) or thermoplastic.

Various known processes or techniques may be used to make fiber-reinforced polymer layers 302. As one example, each one of fiber-reinforced polymer layers 302 may include a sheet of the reinforcing fibrous material pre-impregnated with the polymer matrix material (e.g., a pre-preg), also known as a dry layup. As one example, each one of fiber-reinforced polymer layers 302 may include a sheet of the reinforcing fibrous material and the polymer matrix material is applied to the reinforcing fibrous material, also known as a wet layup.

Composite structure 300 also includes at least one layer of carbon nanomaterial composite sheet 202. Various known processes or techniques may be used to make composite structure 300. In one example implementation, fiber-reinforced polymer layers 302 and carbon nanomaterial composite sheet 202 may be consecutively laid up, for example, within a mold (not explicitly illustrated). Fiber-reinforced polymer layers 302 and carbon nanomaterial composite sheet 202 may be co-cured to form composite structure 300. As one example, and as illustrated in FIG. 6, carbon nanomaterial composite sheet 202 is an outermost layer of the composite lay-up (e.g., defining an exterior surface layer of composite structure 300). As one example, carbon nanomaterial composite sheet 202 is an interior layer of the composite lay-up (e.g., defining an interior layer of composite structure 300).

Composite structure 300 may include any desired three-dimensional ("3D") shape. 3D shape may include various dimensions including a length dimension, a width dimension, a height dimension and/or a cross-sectional dimension of composite structure 300. As one specific, non-limiting example, composite structure 300 may be a skin panel of an aircraft.

Accordingly, the disclosed carbon nanomaterial composite sheet 202 may be integrated into a production process for making composite structure 300. Carbon nanomaterial composite sheet 202 may provide composite structure 300 with effective shielding against EMI and effective lighting strike protection without the need for additional materials.

Composite structure 300 including carbon nanomaterial composite sheet 202 may have broadband EMI shielding effectiveness, which may be particularly beneficial in aerospace applications since each radio frequency ("RF") band may affect electronics and avionics differently. As one example, carbon nanomaterial composite sheet 202 including carrier layer 204 (e.g., carbon fiber veil 210) and carbon nanomaterial structure 242 may be provide effective EMI shielding at medium frequencies (between approximately 100 MHz and approximately 1 GHz) and at high frequencies (greater than approximately 1 GHz). As one example, carbon nanomaterial composite sheet 202 including carrier layer 204 with nickel coating 214 (e.g., nickel coated carbon fiber veil 210) and carbon nanomaterial structure 242 may be provide effective EMI shielding at low frequencies (less than approximately 100 MHz), medium frequencies (between approximately 100 MHz and approximately 1 GHz), and at high frequencies (greater than approximately 1 GHz).

Use of a dielectric material as carrier layer 204 or dielectric layer 256 coupled to carrier layer 204 may provide a barrier to the underlying composite structure 300 for lightning protection by, for example, keeping the lightning current at the surface in the event of a lightning strike and allowing carbon nanomaterial composite sheet 202 to conduct away the energy before it gets into and causes damage to the underlying composite structure 300

In various examples, the materials selected for carbon nanomaterial composite sheet 202 may be selected to provide a desired EMI shielding effectiveness (in decibels) ("dB") for a particular frequency or range of frequencies. As one example, carbon nanomaterial structure 242 (formed from the network of entangled carbon nanomaterials 226) may provide carbon nanomaterial composite sheet 202 with effective EMI shielding at medium and high frequencies. A conductive carrier layer 204 (e.g., formed from a conductive material or a metallic coated material) may provide carbon nanomaterial composite sheet 202 with effective EMI shielding at low frequencies. Accordingly, carbon nanomaterial composite sheet 202 including carrier layer 204 (e.g., carbon fiber veil 210) with metallic coating 254 (e.g., nickel coating 214) and carbon nanomaterial structure 242 may be provide effective EMI shielding at low frequencies, medium frequencies, and high frequencies. Nickel used as metallic coating 254 may beneficially provide the highest shielding performance or effectiveness at low frequencies.

Without being limited to any particular theory, reducing the resistance of carrier layer 204 may equate to an increase in conductivity and, thus, an increase in EMI shielding effectiveness, for example, particularly at low frequencies.

Figure 10:
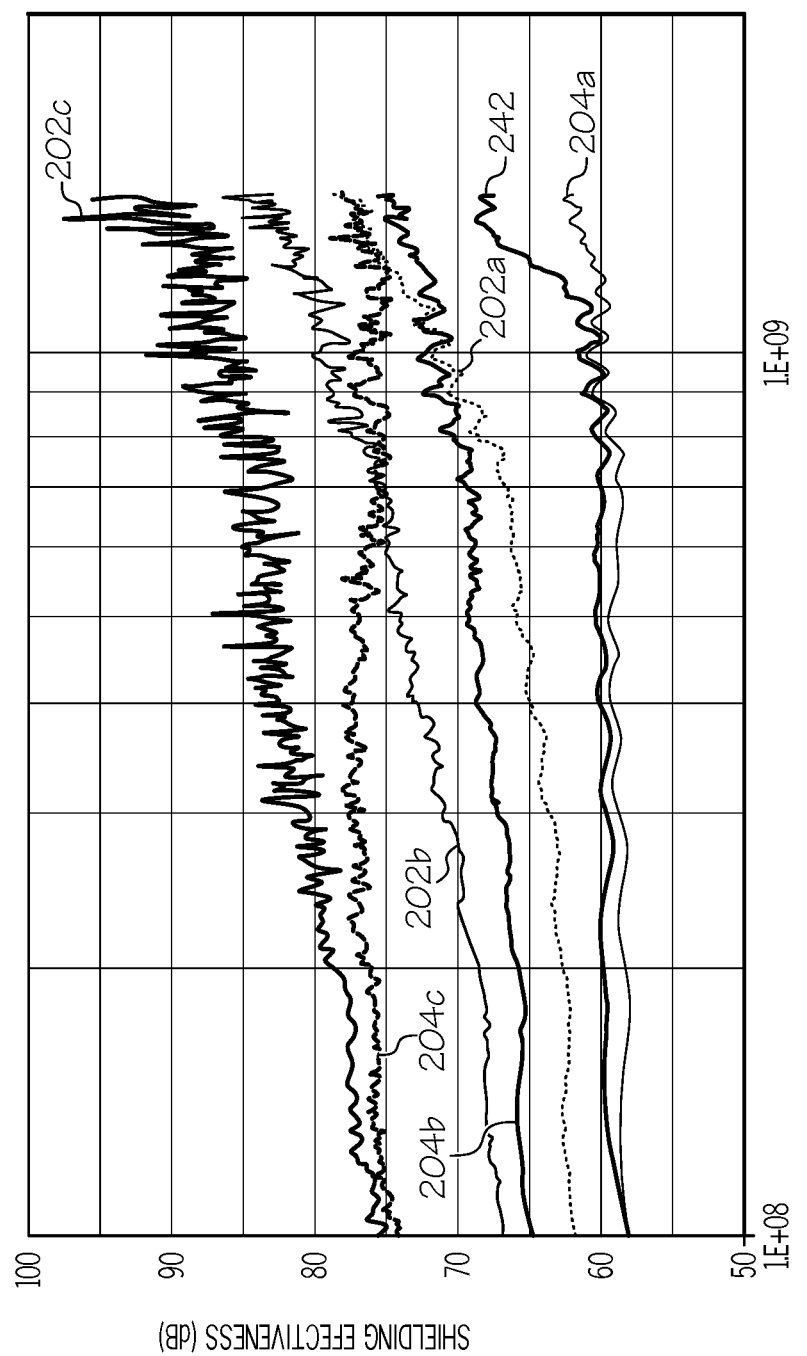
FIG. 10 is a graph showing shielding effectiveness of various examples of the disclosed carbon nanomaterial composite sheet.

As illustrated in FIG. 10, the EMI shielding effectiveness of various material configurations of composite sheet 202 are shown. FIG. 10 shows examples of the shielding effectiveness of first carrier layer 204a, carbon nanomaterial structure 242, first carbon nanomaterial composite sheet 202a, second carrier layer 204b, second carbon nanomaterial composite sheet 202b, third carrier layer 204c, and third carbon nanomaterial composite sheet 202c.

As one example, carbon nanomaterial structure 242 includes an entangled network of carbon nanomaterials 226. Carbon nanomaterial structure 242 may provide a shielding effectiveness ranging from approximately 58 dB to approximately 62 dB over frequencies ranging from approximately 100 MHz to approximately 1 GHz.

As one example, first carrier layer 204a includes a conductive material. The conductive material may include a conductive material layer, a conductive material layer having a metallic coating (e.g., nickel coating), or a non-conductive material layer having a metallic coating. First carrier layer 204a may have a resistance of approximately 0.1 ohm. First carrier layer 204a may provide a shielding effectiveness ranging from approximately 58 dB to approximately 68 dB over frequencies ranging from approximately 100 MHz to approximately 1 GHz.

As one example, first carbon nanomaterial composite sheet 202a includes first carrier layer 204a and carbon nanomaterial structure 242. First carbon nanomaterial composite sheet 202a may provide a shielding effectiveness ranging from approximately 61 dB to approximately 78 dB over frequencies ranging from approximately 100 MHz to approximately 1 GHz.

As one example, second carrier layer 204b includes a conductive material. The conductive material may include a conductive material layer, a conductive material layer having a metallic coating (e.g., nickel coating), or a non-conductive material layer having a metallic coating. Second carrier layer 204b may have a resistance of approximately 0.04 ohm. Second carrier layer 204b may provide a shielding effectiveness ranging from approximately 65 dB to approximately 75 dB over frequencies ranging from approximately 100 MHz to approximately 1 GHz.

As one example, second carbon nanomaterial composite sheet 202b includes second carrier layer 204b and carbon nanomaterial structure 242. Second carbon nanomaterial composite sheet 202b may provide a shielding effectiveness ranging from approximately 67 dB to approximately 86 dB over frequencies ranging from approximately 100 MHz to approximately 1 GHz.

As one example, third carrier layer 204c includes a conductive material. The conductive material may include a conductive material layer, a conductive material layer having a metallic coating (e.g., nickel coating), or a non-conductive material layer having a metallic coating. Third carrier layer 204c may have a resistance of approximately 0.02 ohm. Third carrier layer 204c may provide a shielding effectiveness ranging from approximately 74 dB to approximately 78 dB over frequencies ranging from approximately 100 MHz to approximately 1 GHz.

As one example, third carbon nanomaterial composite sheet 202c includes third carrier layer 204c and carbon nanomaterial structure 242. Third carbon nanomaterial composite sheet 202c may provide a shielding effectiveness ranging from approximately 65 dB to approximately 97 dB over frequencies ranging from approximately 100 MHz to approximately 1 GHz.

Examples of the carbon nanomaterial composite sheet 202 and composite structure 300 and methods for making the same disclosed herein may be described in the context of aircraft manufacturing and service method 1100 as shown in FIG. 7 and aircraft 1200 as shown in FIG. 8.

During pre-production, the illustrative method 1100 may include specification and design, as shown at block 1102, of aircraft 1200, which may include design of composite structure 300 having carbon nanomaterial composite sheet 202, and material procurement, as shown at block 1104. During production, component and subassembly manufacturing, as shown at block 1106, and system integration, as shown at block 1108, of aircraft 1200 may take place. Production of carbon nanomaterial composite sheet 202 and use of carbon nanomaterial composite sheet 202 in composite structure 300, as described herein, may be accomplished as a portion of the production, component and subassembly manufacturing step (block 1106) and/or as a portion of the system integration (block 1108). Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1200 produced by illustrative method 1100 may include airframe 1202, for example, having composite skin panels including carbon nanomaterial composite sheet 202, and a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, and the like.

The apparatuses and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatuses, methods, or combination thereof may be utilized during production stages (blocks 1108 and 1110), for example, by increasing the effective EMI shielding and/or lightning protection of aircraft 1200. Similarly, one or more examples of the apparatuses, methods, or a combination thereof, may be utilized, for example and without limitation, while aircraft 1200 is in service (block 1112) and during maintenance and service stage (block 1114).

Although various examples of the disclosed carbon nanomaterial laminate, composite structure, and methods for making the same have been shown and described, modifications may occur to those skilled in the art upon reading the specification. The present application includes such modifications and is limited only by the scope of the claims.

What is claimed is:

1. A carbon nanomaterial composite sheet in the form of a laminate, useful in a skin panel composite structure of an aircraft, for providing lightning strike protection on the aircraft, the carbon nanomaterial composite sheet consisting essentially of:
    a) a network consisting of randomly oriented, uniformly distributed, and entangled carbon nanotubes, entangled in multiple directions, wherein the carbon nanotubes consist of single-wall carbon nanotubes, and wherein the network includes the single-wall carbon nanotubes in a quantity sufficient to form a number of crossover locations that stabilize the carbon nanotube network;
    b) a porous metalized nonwoven material comprising carbon fiber nonwoven material coated with nickel, and wherein at least some of the single-wall carbon nanotubes of the network are interspersed through a thickness of and entangled with the nickel-coated carbon fiber nonwoven material, to permanently bond the nickel-coated carbon fiber nonwoven material to the network of single wall carbon nanotubes; and
    c) at least one of the following:
        a polymer layer coupled to the network;
        a polymer encapsulating layer coupled to the network; and
        a prepreg material coupled to the network.

2. The carbon nanomaterial composite sheet according to claim 1, wherein the network has a basis weight of at least 1 gram per square meter (gsm).

3. A roll formed from a continuous sheet of the carbon nanomaterial composite sheet of claim 1.

4. The carbon nanomaterial composite sheet according to claim 1, wherein the carbon nanotubes have an aspect ratio of at least 2,500:1.

5. The carbon nanomaterial composite sheet of claim 1 being coupled to a releasable protective film such that the porous metalized nonwoven material is located between the releasable protective film and the network.

6. A composite structure comprising:
    at least one fiber-reinforced polymer layer; and
    the carbon nanomaterial composite sheet of claim 1 connected to the fiber-reinforced polymer layer.

7. A method for imparting lightning strike protection to a composite structure comprising:
    incorporating into said composite structure the carbon nanomaterial composite sheet of claim 1.

8. A method for imparting electromagnetic interference shielding to a composite structure comprising:
    incorporating into said composite structure the carbon nanomaterial composite sheet of claim 1.

9. The carbon nanomaterial composite sheet according to claim 1 comprising the polymer layer coupled to the network.

10. The carbon nanomaterial composite sheet according to claim 1 comprising the polymer encapsulating layer coupled to the network.

11. The carbon nanomaterial composite sheet according to claim 1 comprising the prepreg material coupled to the network.

12. The composite structure of claim 6 wherein the network has a basis weight of at least 1 gram per square meter (gsm).

13. The composite structure of claim 6 wherein the carbon nanotubes have an aspect ratio of at least 2,500:1.

14. The composite structure of claim 6 wherein the carbon nanomaterial composite sheet comprises the polymer layer coupled to the network.

15. The composite structure of claim 6 wherein the carbon nanomaterial composite sheet comprises the polymer encapsulating layer coupled to the network.

16. The composite structure of claim 6 wherein the carbon nanomaterial composite sheet comprises the prepreg material coupled to the network.

17. A carbon nanomaterial composite sheet in the form of a laminate, useful in a skin panel composite structure of an aircraft, for providing lightning strike protection on the aircraft, the carbon nanomaterial composite sheet consisting essentially of:
   a) a network consisting of randomly oriented, uniformly distributed, and entangled carbon nanotubes, entangled in multiple directions, wherein the carbon nanotubes consist of single-wall carbon nanotubes, wherein the network includes the single-wall carbon nanotubes in a quantity sufficient to form a number of crossover locations that stabilize the carbon nanotube network, and wherein the network has a basis weight of at least 1 gram per square meter (gsm); and
   b) a porous metalized nonwoven material comprising carbon fiber nonwoven material coated with nickel, and wherein at least some of the single-wall carbon nanotubes of the network are interspersed through a thickness of and entangled with the nickel-coated carbon fiber nonwoven material, to permanently bond the nickel-coated carbon fiber nonwoven material to the network of single wall carbon nanotubes.

18. The carbon nanomaterial composite sheet if claim 17 wherein the carbon nanotubes have an aspect ratio of at least 2,500:1.

19. A composite structure comprising:
   at least one fiber-reinforced polymer layer; and
   the carbon nanomaterial composite sheet of claim 17 connected to the fiber-reinforced polymer layer.

20. A carbon nanomaterial composite sheet in the form of a laminate, useful in a skin panel composite structure of an aircraft, for providing lightning strike protection on the aircraft, the carbon nanomaterial composite sheet consisting essentially of:
   a) a network consisting of randomly oriented, uniformly distributed, and entangled carbon nanotubes, entangled in multiple directions, wherein the carbon nanotubes consist of single-wall carbon nanotubes, and wherein the network includes the single-wall carbon nanotubes in a quantity sufficient to form a number of crossover locations that stabilize the carbon nanotube network;
   b) a porous metalized nonwoven material comprising carbon fiber nonwoven material coated with nickel, and wherein at least some of the single-wall carbon nanotubes of the network are interspersed through a thickness of and entangled with the nickel-coated carbon fiber nonwoven material, to permanently bond the nickel-coated carbon fiber nonwoven material to the network of single wall carbon nanotubes; and
   c) a releasable protective film coupled to the porous metalized nonwoven material such that the porous metalized nonwoven material is located between the releasable protective film and the network.

* * * * *